(12) United States Patent
Vassallo et al.

(10) Patent No.: US 6,711,257 B1
(45) Date of Patent: Mar. 23, 2004

(54) TELEPHONE INDICATOR SYSTEM AND METHOD

(75) Inventors: Steven P. Vassallo, Palo Alto, CA (US); Steven R. Takayama, Atherton, CA (US); Jonathan I. Kaplan, Palo Alto, CA (US); Rudy L. Samuels, Bolinas, CA (US); Heather Andrus, San Francisco, CA (US); Jochen P. Backs, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/361,653

(22) Filed: Jul. 27, 1999

(51) Int. Cl.7 .............................. H04M 1/00; H04M 9/00
(52) U.S. Cl. ............................ 379/387.01; 379/428.02; 379/376.01
(58) Field of Search .................... 379/164, 387.01, 379/428.03, 433.04, 142.17, 376.01; 455/566, 567

(56) References Cited

U.S. PATENT DOCUMENTS 5,465,193 A * 11/1995 Tracy
5,752,195 A * 5/1998 Tsuji et al.

OTHER PUBLICATIONS

"Philips Consumer Communications: Elegance 33"; www-.philipsconsumer.com/pro...m?ID=1179&country_code=110&nonshoc;. (1 pg.), Oct. 19, 1999.

"Consumer Elecronics Press Releases: New Elegance TM corded phones and answering machines from Philips set the standard in style and features"; www.–us.sv.philips.com/news/press/elegance.htm (3 pgs.), Oct. 20, 1999.

* cited by examiner

*Primary Examiner*—Duc Nguyen
(74) *Attorney, Agent, or Firm*—Baker Botts L.L.P.

(57) ABSTRACT

A telephone indicator system includes a telephone having a base and a handset. The telephone includes a cradle disposed on the base configured to receive the handset. The system also includes an indicator disposed on an least two elevated surfaces of the telephone to notify a user of a telephone message. The indicator may be disposed on at least two elevated surfaces of the handset. The system may also include another indicator disposed in the cradle of the telephone to notify the user of another telephone message while the handset is in use.

19 Claims, 2 Drawing Sheets

TELEPHONE INDICATOR SYSTEM AND METHOD

TECHNICAL FIELD OF THE INVENTION

The present invention relates generally to the field of telephone systems, and more particularly, to a telephone indicator system and method.

BACKGROUND OF THE INVENTION

Telephones often employ indicators to notify a user of various messages associated with the telephone. For example, indicators may be used to notify the user of an incoming call, a telephone mail message waiting in queue, a call on hold, muted call activation, and other types of messages associated with a telephone. Indicators may include aural notification of a telephone message, such as a bell, tone, or other audio signal. Indicators may also provide visual notification of a telephone message, such as a light located adjacent text indicating the type of message.

However, known telephone systems present certain drawbacks. For example, known telephone systems generally include indicators visible to a user only when the user is in close proximity to the telephone. Additionally, indicators transmitting an audio signal of a telephone message have a limited range of effectiveness and may be unacceptable in certain environments. For example, audio indicators may be ineffective in office areas containing a large quantity of telephones because a user may not be able to determine which phone is transmitting an indicator signal.

SUMMARY OF THE INVENTION

Accordingly, a need has arisen for an improved telephone indicator system and method. The present invention provides a telephone indicator system and method that addresses shortcomings of prior systems and methods.

According to one embodiment of the present invention, a telephone indicator system includes a telephone having a base and a handset. The system also includes a cradle disposed on the base configured to receive the handset. The system further includes an indicator disposed on at least two elevated surfaces of the telephone operable to notify a user of a telephone message.

According to another embodiment of the present invention, a telephone indicator system includes a telephone having a base, a handset, and a cradle configured to receive the handset. The system also includes a signal generator disposed in the cradle. The system further includes a conductor disposed in the handset. The conductor is operable to transmit a signal from the signal generator to an elevated surface of the handset.

According to another embodiment of the present invention, a method for indicating telephone messages includes providing a telephone having a base and a handset. The base includes a cradle configured to receive the handset. The method also includes notifying a user of a first telephone message using a first indicator disposed on the handset. The method further includes notifying the user of a second telephone message using a second indicator disposed in the cradle while the handset is displaced from the cradle.

Technical advantages of the present invention include providing a telephone indicator system readily viewable from a variety of locations relative to the telephone. For example, according to one aspect of the present invention, an indicator may be placed on an elevated surface of the telephone, such as on an upwardly facing surface of the handset, to provide an increased range of view of the indicator.

Another technical advantage of the present invention includes providing a user with continuous message notification while using the telephone. For example, according to another aspect of the present invention, an indicator may be located in a cradle of the telephone beneath the handset. Thus, after the handset has been removed from the cradle, the cradle indicator notifies the user of additional messages while the handset is in use.

Other aspects and technical advantages will be readily apparent to one skilled in the art from the following figures, descriptions, and claims.

BRIEF DESCRIPTION OF THE DRAWINGS

For a more complete understanding of the present invention and the advantages thereof, reference is now made to the following descriptions taken in connection with the accompanying drawings in which.

DETAILED DESCRIPTION OF THE INVENTION

The teachings of the present invention are best understood by referring to the following description and drawings, wherein like numerals are used for like and corresponding parts of the various drawings.

Figure 1:
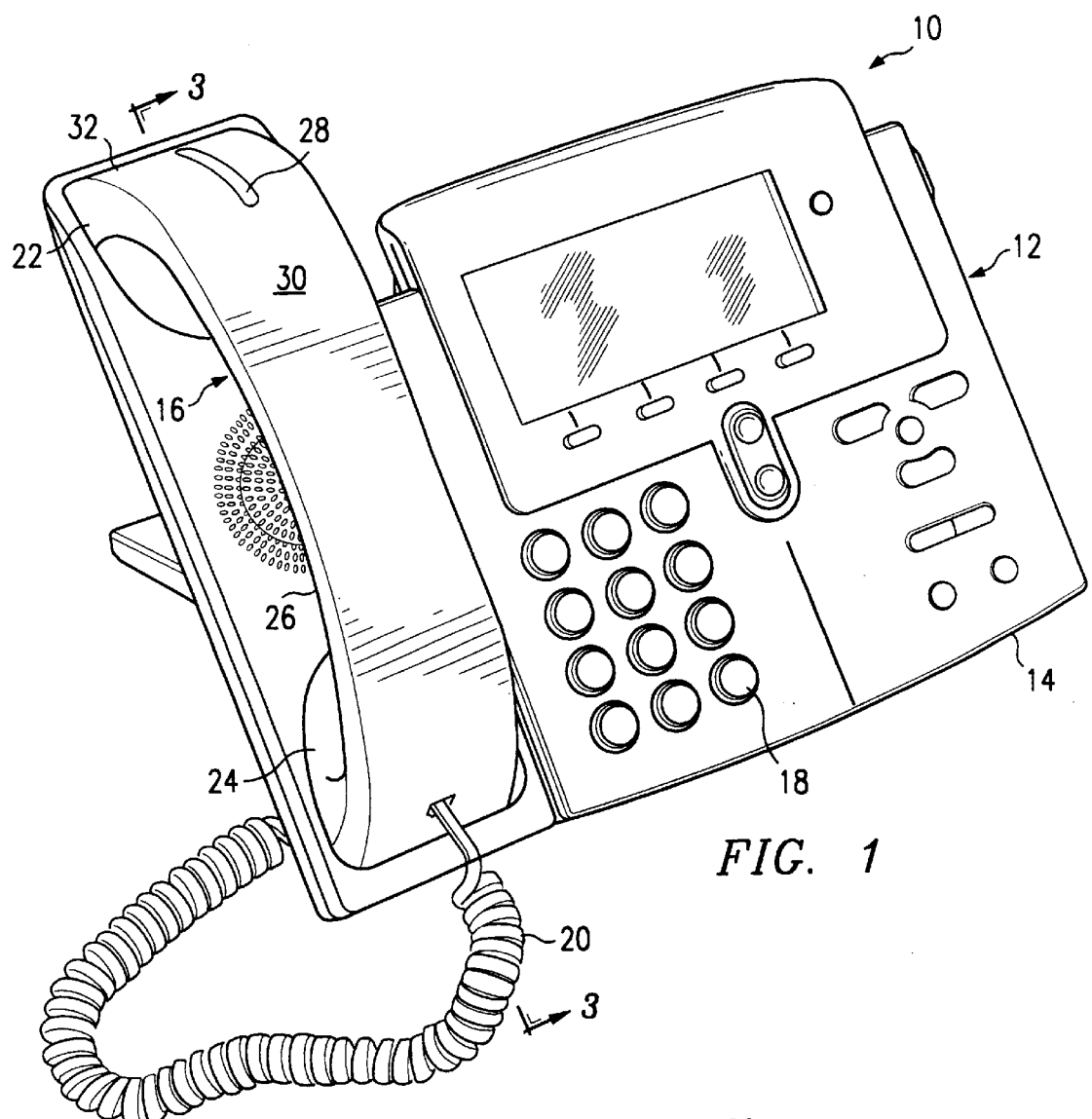
FIG. 1 is a schematic diagram of a telephone indicator system in accordance with an embodiment of the present invention.

FIG. 1 is a schematic diagram illustrating a telephone indicator system 10 in accordance with an embodiment of the present invention. System 10 includes a telephone 12 having a base 14 and a handset 16. Base 14 may include a keypad 18 and other telephone function controls, such as a speaker control, a mute control, a forwarding control, a hold control, and the like. Telephone 12 also includes a cord 20 to provide a communication medium between base 14 and handset 16 for transporting audio communication signals between handset 16 and base 14. However, telephone 12 may be configured without cord 20, such as cordless telephone communication systems.

Handset 16 may include an earpiece 22, a mouthpiece 24, and a holding portion 26. Earpiece 22 may include internal communication hardware for receiving communication signals from base 14. Mouthpiece 24 may include internal communication hardware for transmitting communication signals from handset 16 to base 14. Holding portion 26 may be used for removing handset 16 from base 14.

Handset 16 also includes an indicator 28 extending from an outwardly facing portion 30 of handset 16 to an upwardly facing portion 32 of handset 16. As illustrated in FIG. 1, indicator 28 may be configured having an elongated elliptical configuration; however, indicator 28 may also have other suitable shapes and configurations.

Indicator 28 may be used to notify a user of an incoming telephone call, a telephone mail message held in queue, or other types of messages associated with telephone 12. Locating indicator 28 on outwardly facing portion 30 and upwardly facing portion 32 of handset 16 provides an indicating surface having a greater range of view than prior systems. For example, as illustrated in FIG. 1, indicator 28 is located on an elevated surface of telephone 12. Thus, indicator 28 may be seen by a user at greater distances from telephone 12. Additionally, extending indicator 28 onto upwardly facing portion 32 of handset 16 provides a view of indicator 28 from behind telephone 12, such as from a location opposite the surface of telephone 12 containing keypad 18. Therefore, indicator 28 is viewable from opposing directions relative to telephone 12.

Figure 2:
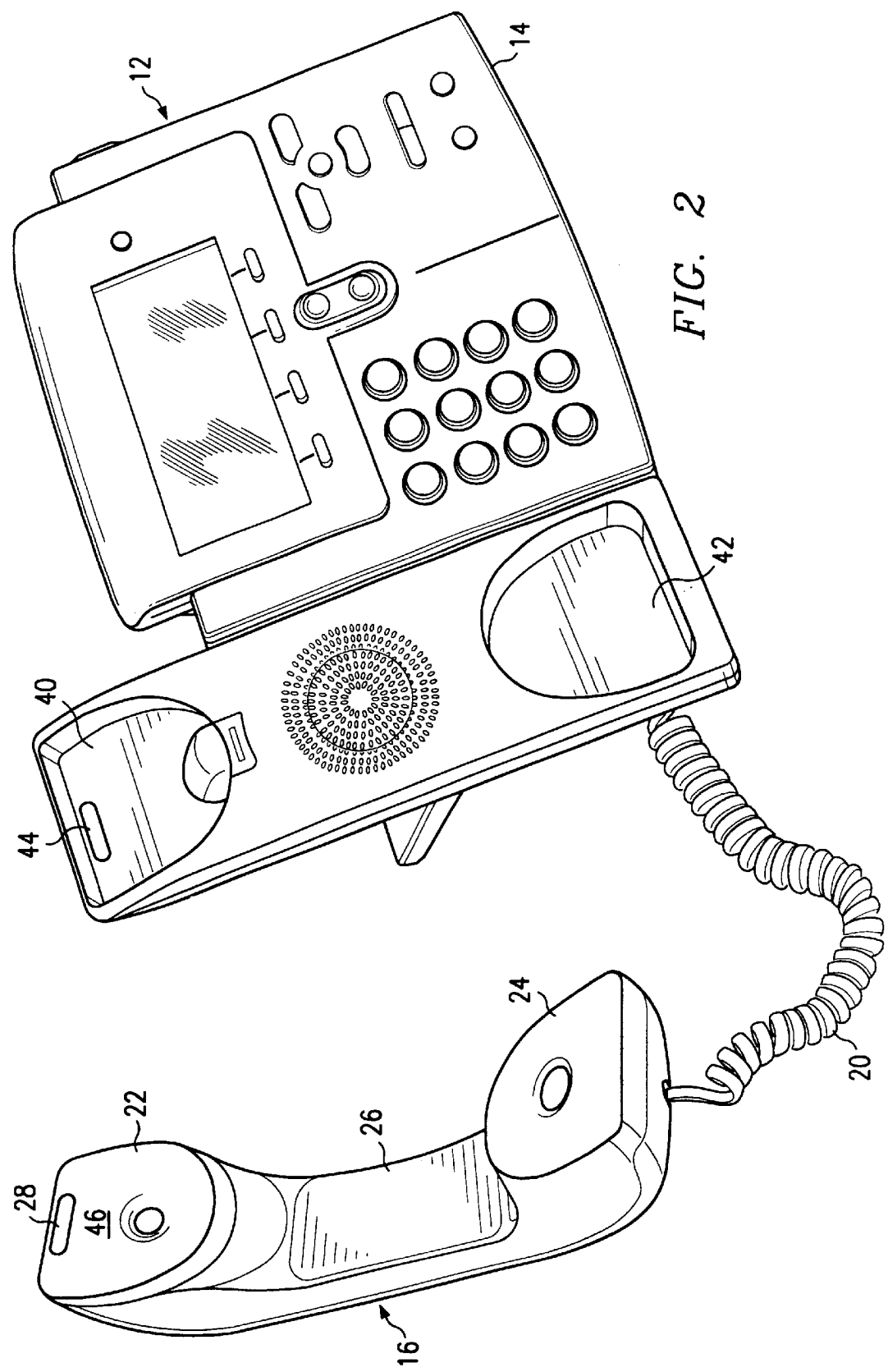
FIG. 2 is a schematic diagram of the telephone indicator system illustrated in FIG. 1 in accordance with an embodiment of the present invention.

FIG. 2 is a schematic diagram of telephone indicator system 10 illustrated in FIG. 1 with handset 16 removed. from base 14. As illustrated in FIG. 2, base 14 includes a cradle 40 for receiving earpiece 22 of handset 16 and a cradle 42 for receiving mouthpiece 24 of handset 16. Telephone 12 also includes an indicator 44 located in cradle 40 of base 14. Indicator 44 may be used to notify a user of an incoming telephone call, a telephone mail message held in queue, or other types of messages associated with telephone 12. Thus, indicator 44 may be used to provide additional and continuous notification of telephone messages while handset 16 is in use or removed from base 14.

As illustrated in FIGS. 1 and 2, indicator 28 extends from portions 30 and 32 of handset 16 to an earpiece surface 46. Indicator 28 may also be configured to transmit a signal generated by indicator 44 to portions 30 and 32 of handset 16. For example, indicator 28 may be positioned on earpiece surface 46 aligned with indicator 44 as handset 16 is placed in cradles 40 and 42. Thus, in operation, indicator 44 may transmit a signal to portions 30 and 32 of handset 16 via indicator 28.

Additionally, indicator 44 may also be used to notify a user of a telephone message while handset 16 is in use or removed from cradles 40 and 42. For example, after handset 16 has been removed from cradles 40 and 42, indicator 44 is visible to a user of telephone 12. Thus, as subsequent telephone messages are received by telephone 12, indicator 44 may be used to notify the user of additional telephone messages. Therefore, system 10 provides notification of telephone messages while handset 16 is both disposed in cradles 40 and 42 and displaced from cradles 40 and 42.

Figure 3:
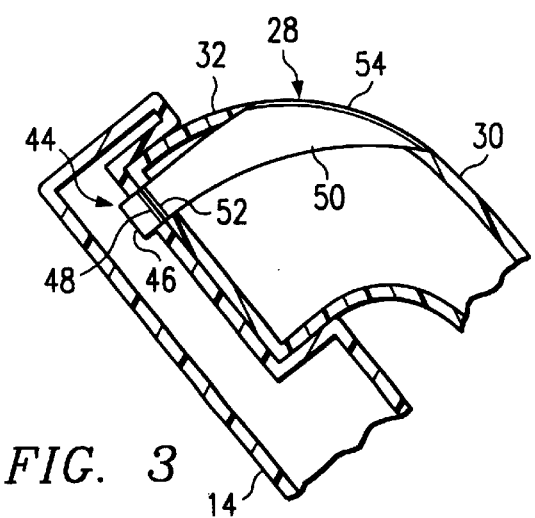
FIG. 3 is a cross-section view of the telephone indicator system illustrated in FIG. 1 taken along the line 3—3 of FIG. 1.

FIG. 3 is a section view of telephone indicator system 10 illustrated in FIG. 1 taken along the line 3—3 of FIG. 1. In this example, indicator 44 includes a signal generator 46 for transmitting a signal to notify a user of a telephone message. Signal generator 46 may include a light emitting diode or other suitable signal generating device. Indicator 44 may also include a frosted surface 48 for diffusing a light signal transmitted by signal generator 46.

Indicator 28 of handset 16 may include a conductor 50 for transmitting signals from signal generator 46 to portions 30 and 32 of handset 16. For example, conductor 50 may include an optically transmissive member having a reflective interior surface for transmitting light signals from signal generator 46. Additionally, indicator 28 may include a polished surface 52 for receiving light signals from signal generator 46 and a textured surface 54 for diffusing light signals at portions 30 and 32. Textured surface 54 may be formed by blasting to provide greater light diffusion properties; however, other suitable methods or devices may be used to provide greater visibility of light signals received from indicator 44.

In operation, electronic circuitry contained in base 14 of telephone 12 causes indicator 44 to transmit a signal to notify a user of a telephone message. The signal from indicator 44 is received at earpiece surface 46 by indicator 28 and transmitted to portions 30 and 32 of handset 16. For example, signal generator 46 may be configured as a light emitting diode to generate a light signal. Conductor 50 may be configured as an optically transmissive member or filament for transmitting the light signal from signal generator 46 to portions 30 and 32 of handset 16.

As described above in connection with FIG. 2, system 10 also provides a user with telephone message notification while handset 16 is in use or removed from base 14. For example, as handset 16 is displaced from cradles 40 and 42, indicator 44 becomes visible to a user of telephone 12. Thus, while handset 16 is in use, a user may be notified of additional telephone messages by directly viewing indicator 44.

The present invention also provides greater flexibility than prior telephone systems by providing an independent channel of telephone message indication. For example, a signal notifying a user of a telephone message may be transmitted from signal generator 46 to portions 30 and 32 of handset 16 independently of cord 20, thereby reducing the amount of electrical circuitry within cord 20 required to transmit message notification from base 14 to handset 16. Accordingly, the present invention may also be used in cordless telephone applications.

Although the present invention and its advantages have been described in detail, it should be understood that various changes, substitutions, and alterations can be made therein without departing from the spirit and scope of the present invention as defined by the appended claims.

What is claimed is:

1. A telephone indicator system comprising:
   a telephone having a base and a handset, the handset comprising an earpiece;
   a cradle disposed on the base operable to receive the handset; and
   an indicator disposed on a curved surface of the handset opposite the earpiece, the indicator operable to indicate a telephone message, the indicator extending from a first portion of the curved surface to a second portion of the curved surface such that the indicator is viewable from opposing directions.

2. The system of claim 1, wherein the indicator is disposed on a surface of the handset.

3. The system of claim 1, wherein the indicator comprises:
   a signal generator disposed in the cradle; and
   a conductor disposed in the handset, the conductor operable to transmit a signal from the signal generator to a surface of the handset.

4. The system of claim 3, wherein the signal generator comprises a light emitting diode, and wherein the conductor comprises an optically transmissive member.

5. The system of claim 1, further comprising a cord connecting the base to the handset, the cord operable to transmit audio signals from the base to the handset, and wherein the conductor is operable to transmit the signal from the signal generator independently of the cord.

6. The system of claim 1, wherein the indicator is active only while the handset is disposed in the cradle.

7. A telephone indicator system comprising:
   a telephone having a base and a handset;
   a cradle disposed on the base and configured to receive an earpiece surface of the handset;
   a first indicator disposed on the cradle; and
   a second indicator extending from the earpiece surface of the handset proximate the first indicator to a second surface of the handset opposite the earpiece surface, the first and second indicators operable to notify a user of a telephone message.

8. The system of claim 7, wherein the second indicator is inactive while the handset is displaced from the cradle.

9. The system of claim 7, wherein the first indicator comprises a light emitting diode, and wherein the second indicator comprises an optically transmissive member operable to transmit a signal from the diode to a surface of the handset.

10. The system of claim 7, wherein the first indicator is operable to notify the user of the telephone message while the handset is displaced from the cradle.

11. A method for indicating a telephone message comprising:

providing a telephone having a base and a handset, the base having a cradle configured to receive the handset;

generating a signal from a signal generator disposed in the cradle, the signal to notify a user of the telephone message; and transmitting the signal from an earpiece surface of the handset to an indicating surface of the handset, the indicating surface of the handset opposite the earpiece surface, the signal viewable from opposing directions.

12. The method of claim 11, wherein generating a signal comprises generating a light signal, and wherein transmitting the signal comprises reflecting the light signal to the indicating surface of the handset.

13. The method of claim 11, wherein transmitting a signal comprises:

receiving the signal at a receiving surface of the handset, the receiving surface aligned with the signal generator;

transmitting the signal from the receiving surface to the indicating surface; and diffusing the signal from the indicating surface.

14. A method for indicating telephone messages comprising:

providing a telephone having a base and a handset, the base having a cradle configured to receive an earpiece surface of the handset;

notifying a user of a first telephone message using a first indicator disposed on an indicating surface of the handset opposite the earpiece surface; and notifying the user of a second telephone message using a second indicator disposed in the cradle while the handset is displaced from the cradle.

15. The method of claim 14, wherein notifying a user of a first telephone message comprises:

generating a signal from the second indicator; and transmitting the signal to a surface of the handset.

16. The method of claim 14, wherein notifying a user of a first telephone message comprises transmitting a signal generated by the second indicator to a surface of the handset, the signal viewable from opposing directions.

17. The method of claim 14, wherein notifying a user of a first telephone message comprises:

generating a light signal from the second indicator;

reflecting the light signal from a receiving surface of the handset to an indicating surface of the handset; and diffusing the light signal out of the first indicator.

18. The method of claim 14, wherein notifying the user of a second telephone message comprises generating a signal from the second indicator, the second indicator visible only while the handset is displaced from the cradle.

19. The method of claim 14, wherein providing a telephone further comprises providing a telephone having a cord operable to transmit a communication signal from the base to the handset, and wherein notifying a user of a first telephone message comprises transmitting an indicator signal from the second indicator to the first indicator independently of the cord.

* * * * *

UNITED STATES PATENT AND TRADEMARK OFFICE
CERTIFICATE OF CORRECTION

PATENT NO. : 6,711,257 B1
DATED : March 23, 2004
INVENTOR(S) : Vassallo et al.

Page 1 of 1

It is certified that error appears in the above-identified patent and that said Letters Patent is hereby corrected as shown below:

<u>Title page,</u>
Item [57], ABSTRACT,
Line 6, after "on" delete "an" and insert -- at --.

Signed and Sealed this

Thirty-first Day of August, 2004

JON W. DUDAS
*Director of the United States Patent and Trademark Office*